(12) United States Patent
Benson et al.

(10) Patent No.: US 9,275,626 B2
(45) Date of Patent: Mar. 1, 2016

(54) AUDIO SYSTEM

(71) Applicant: Sony Computer Entertainment Europe Limited, London (GB)

(72) Inventors: Simon Mark Benson, London (GB); Ian Henry Bickerstaff, London (GB)

(73) Assignee: Sony Computer Entertainment Europe Limited (GB)

( * ) Notice: Subject to any disclaimer, the term of this patent is extended or adjusted under 35 U.S.C. 154(b) by 300 days.

(21) Appl. No.: 13/886,806

(22) Filed: May 3, 2013

(65) Prior Publication Data

US 2013/0293723 A1    Nov. 7, 2013

(30) Foreign Application Priority Data

May 4, 2012   (GB) .................................. 1207903.4

(51) Int. Cl.
| | |
|---|---|
| H04R 25/00 | (2006.01) |
| H04R 9/08 | (2006.01) |
| H04R 11/04 | (2006.01) |
| H04R 17/02 | (2006.01) |

(Continued)

(52) U.S. Cl.
CPC ............ *G10K 11/175* (2013.01); *G02B 27/017* (2013.01); *G10K 11/1788* (2013.01); *H04R 1/1083* (2013.01); *H04R 5/033* (2013.01); *G10K 2210/1081* (2013.01); *G10K 2210/3215* (2013.01)

(58) Field of Classification Search
CPC .............. G02B 27/017; G10K 11/175; G10K 11/1788; G10K 2210/1081; G10K 2210/3215; H04R 1/10; H04R 1/28; H04R 1/1083; H04R 2203/12; H04R 2430/20; H04R 5/033

USPC ......................... 381/56, 57, 72, 74, 370, 373
See application file for complete search history.

(56) References Cited

U.S. PATENT DOCUMENTS

| | | | |
|---|---|---|---|
| 5,742,264 | A | 4/1998 | Inagaki et al. |
| 5,900,849 | A | 5/1999 | Gallery |

(Continued)

FOREIGN PATENT DOCUMENTS

| | | |
|---|---|---|
| EP | 1731943 A1 | 12/2006 |
| GB | 2348513 A | 10/2000 |

(Continued)

OTHER PUBLICATIONS

Extended European Search Report for Application No. 13166550.7 dated Sep. 4, 2014.

(Continued)

*Primary Examiner* — Khai N Nguyen
(74) *Attorney, Agent, or Firm* — Lerner, David, Littenberg, Krumholz & Mentlik, LLP

(57) ABSTRACT

An audio system comprises a headset comprising a pair of earpieces positionable with respect to the user's ears so that, in use, the user is inhibited from hearing sounds from the user's environment, at least one of the earpieces having a transducer for reproducing sounds from an input audio signal; a microphone for generating a captured audio signal representing captured sounds from the user's environment; a detector for detecting the presence of any of a set of one or more characteristic sounds in the captured audio signal; and a controller operable to transmit sounds from the user's environment to the user in response to a detection that one or more of the set of characteristic sounds is present in the captured audio signal.

10 Claims, 9 Drawing Sheets

(51) Int. Cl.
| | |
|---|---|
| *H04R 19/04* | (2006.01) |
| *H04R 21/02* | (2006.01) |
| *H04R 29/00* | (2006.01) |
| *G10K 11/175* | (2006.01) |
| *G02B 27/01* | (2006.01) |
| *G10K 11/178* | (2006.01) |
| *H04R 1/10* | (2006.01) |
| *H04R 5/033* | (2006.01) |

(56) References Cited

U.S. PATENT DOCUMENTS

| | | | |
|---|---|---|---|
| 5,959,597 A * | 9/1999 | Yamada et al. | 345/8 |
| 6,636,826 B1 | 10/2003 | Abe et al. | |
| 7,124,425 B1 | 10/2006 | Anderson, Jr. et al. | |
| 7,936,885 B2 * | 5/2011 | Frank et al. | 381/57 |
| 2003/0223612 A1 | 12/2003 | Knorr et al. | |
| 2005/0231599 A1 | 10/2005 | Yamasaki | |
| 2006/0153394 A1 * | 7/2006 | Beasley | 381/57 |
| 2007/0035530 A1 | 2/2007 | Van Geest et al. | |
| 2007/0085993 A1 * | 4/2007 | Brown, Jr. | 356/3 |
| 2007/0195012 A1 * | 8/2007 | Ichikawa et al. | 345/8 |
| 2007/0223717 A1 * | 9/2007 | Boersma | 381/74 |
| 2009/0232325 A1 * | 9/2009 | Lundquist | 381/74 |
| 2010/0040240 A1 * | 2/2010 | Bonanno | 381/74 |
| 2010/0079356 A1 * | 4/2010 | Hoellwarth | 345/8 |
| 2010/0157433 A1 | 6/2010 | Mukawa et al. | |
| 2011/0158478 A1 * | 6/2011 | Yamada et al. | 382/103 |
| 2011/0222701 A1 * | 9/2011 | Donaldson et al. | 381/74 |
| 2011/0234584 A1 * | 9/2011 | Endo | 345/419 |
| 2011/0234619 A1 | 9/2011 | Tokunaga | |
| 2011/0235813 A1 * | 9/2011 | Gauger, Jr. | 381/57 |
| 2012/0050140 A1 | 3/2012 | Border et al. | |
| 2012/0071997 A1 * | 3/2012 | Aliakseyeu et al. | 700/94 |
| 2012/0082335 A1 * | 4/2012 | Duisters et al. | 381/375 |
| 2012/0259626 A1 * | 10/2012 | Li et al. | 704/226 |
| 2013/0005467 A1 | 1/2013 | Kim | |
| 2013/0114821 A1 * | 5/2013 | Hamalainen | 381/71.6 |
| 2013/0335301 A1 | 12/2013 | Wong et al. | |
| 2014/0009561 A1 | 1/2014 | Sutherland et al. | |
| 2015/0002490 A1 | 1/2015 | Han et al. | |

FOREIGN PATENT DOCUMENTS

| | | |
|---|---|---|
| GB | 2376397 A | 12/2002 |
| JP | 11211458 | 8/1999 |
| WO | 2006026812 A2 | 3/2006 |

OTHER PUBLICATIONS

Extended European Search Report for Application No. 13166549.9 dated Nov. 11, 2013.

Partial European Search Report for Application No. EP13166549 dated Jul. 16, 2013.

British Search Report for Application No. GB1207903.4 dated Aug. 21, 2012.

British Search Report for Application No. GB1207903.4 dated Nov. 30, 2012.

British Search Report for Application No. GB1207904.2 dated Aug. 29, 2012.

British Search Report for Application No. GB1207864.8 dated Aug. 31, 2012.

* cited by examiner

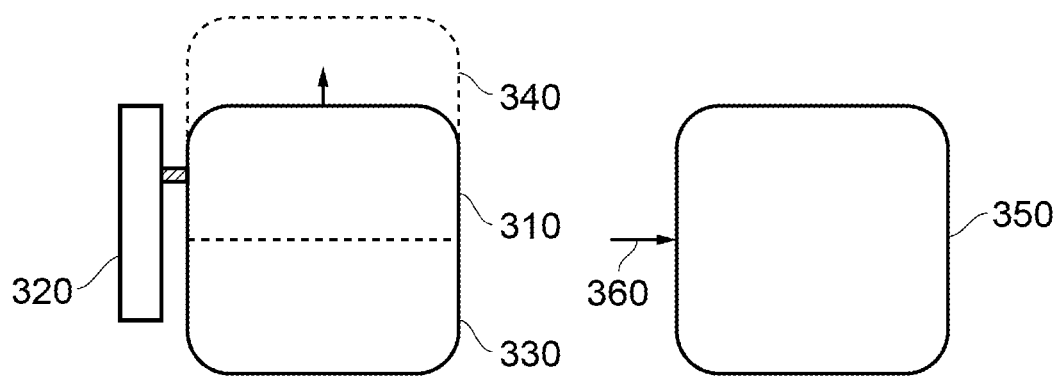
FIG. 8
FIG. 9
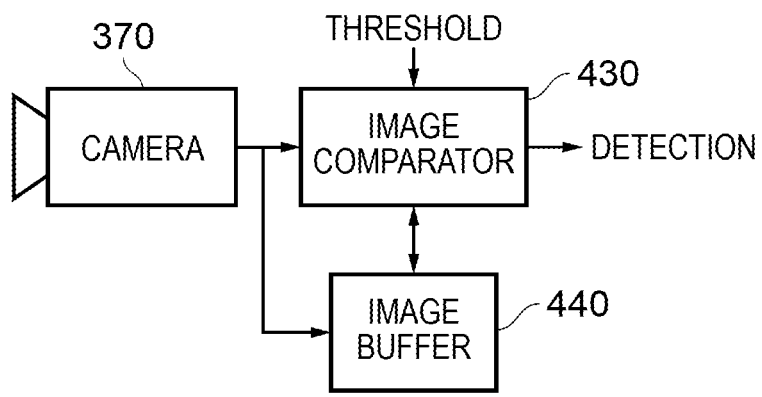
FIG. 11
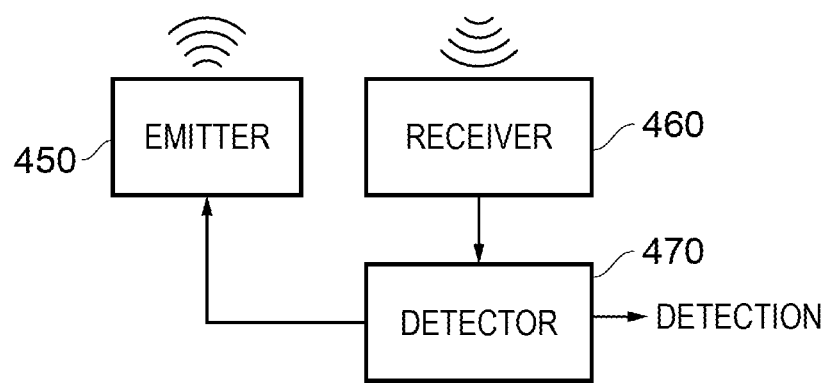
FIG. 12

AUDIO SYSTEM

CROSS REFERENCE TO RELATED APPLICATIONS

The present application claims the benefit of and priority to GB Application No. 1207903.4, filed May 4, 2012, the entire content of which application is incorporated herein by reference.

BACKGROUND

1. Field

This invention relates to audio systems.

2. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

A head-mountable display (HMD) is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the users eyes.

Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

In head mountable displays where the user sees only the displayed images, and potentially hears only the generated sounds provided by a headset, the user is shielded from interaction with the real world. Such arrangements can be referred to as "total immersion" meaning that substantially all of the user's attention is taken up by the audio and video supplied by the head mountable display. While this can give an improved audio/video or gaming experience, it can lead to health and safety problems because the user is unaware of outside events.

SUMMARY

This invention provides an audio system comprising:

a headset comprising a pair of earpieces positionable with respect to the user's ears so that, in use, the user is inhibited from hearing sounds from the user's environment, at least one of the earpieces having a transducer for reproducing sounds from an input audio signal;

a microphone for generating a captured audio signal representing captured sounds from the user's environment;

a detector for detecting the presence of any of a set of one or more characteristic sounds in the captured audio signal; and a controller operable to transmit sounds from the user's environment to the user in response to a detection that one or more of the set of characteristic sounds is present in the captured audio signal.

Further respective aspects and features of the invention are defined by the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 schematically illustrates a movable shutter;

FIG. 9 schematically illustrates an electrically alterable shutter;

FIG. 11 schematically illustrates a camera-based object detection arrangement;

FIG. 12 schematically illustrates an emitter-receiver based object detection arrangement;

DESCRIPTION OF THE PREFERRED EMBODIMENTS

Various techniques will be described in connection with embodiments of the present invention. Some of these techniques relate to the handling of audio signals. Such techniques are applicable to embodiments which deal only with audio reproduction (such as audio headsets) or to embodiments which deal with audio and video reproduction (such as head mountable displays with audio reproduction facilities). Others of the techniques relate to the handling of video signals. Such techniques are applicable to embodiments which deal only with video reproduction (such as head mountable displays) or to embodiments which deal with audio and video reproduction (such as head mountable displays with audio reproduction facilities).

Figure 1:
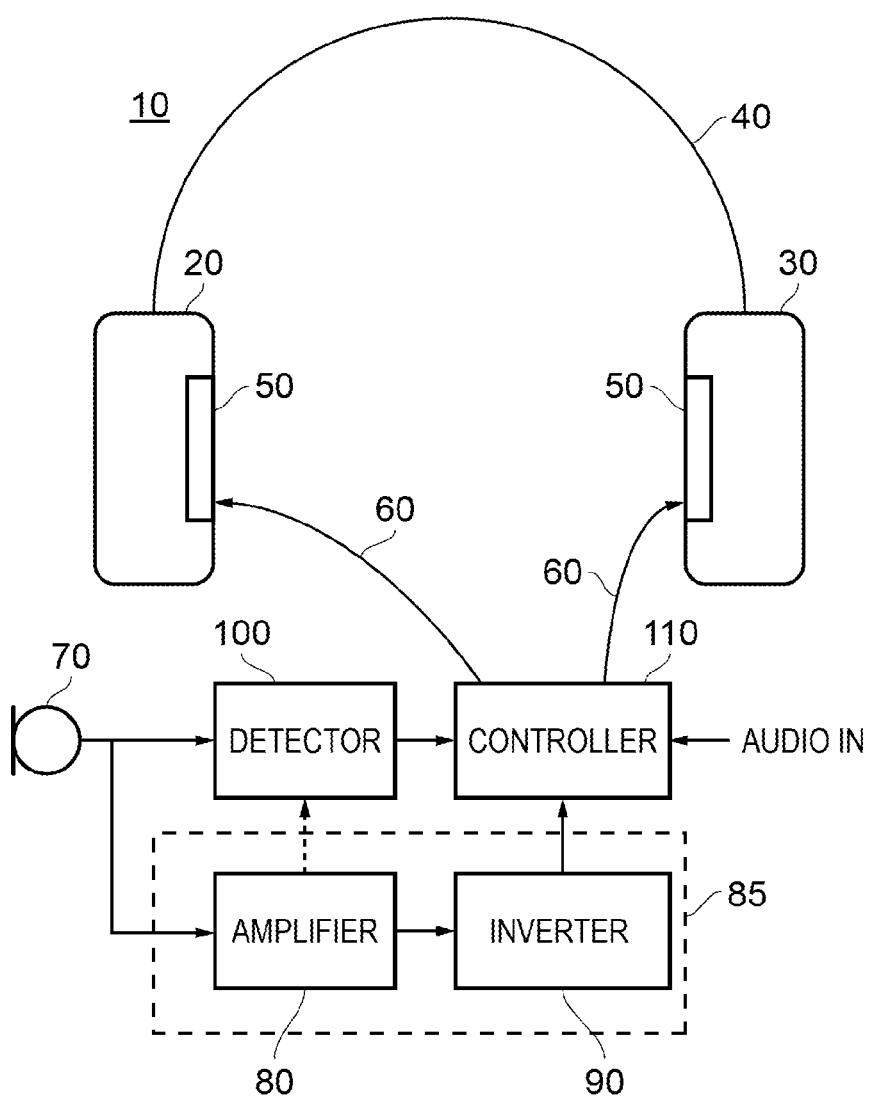
FIG. 1 schematic illustrates a noise cancelling headset.

Referring now to the drawings, FIG. 1 schematic illustrates a noise cancelling headset 10 comprising a pair of earpieces 20, 30, one for each of a user's ears when in use, together with a support band 40 which passes over the user's head to support the earpieces 20, 30. Accordingly, the earpieces are positionable with respect to the users ears so that, in use, the user is inhibited from hearing sounds from the user's environment. At least one of the earpieces (preferably both) has a transducer for reproducing sounds from an input audio signal. It will be appreciated that the support band 40 may pass behind (rather than over) the users head, or in other embodiments the support band 40 may not in fact be needed, if the earpieces 20, 30 are of such a size and shape that they may be supported merely by friction with the inner surface of the ear, or, (for example) by individual over-the-ear clips.

Each earpiece 20, 30 includes a respective audio transducer 50 connectable to an audio signal source for reproducing as an audible output electrical signals which are supplied to the transducers via a cable or wireless connection 60. The earpieces may each comprise sound insulating formations to inhibit the transmission of sound from the environment to the user's ears.

Embodiments of the invention relate to a noise cancelling headset, and the arrangement shown in FIG. 1 includes features relevance to noise cancellation. It will be appreciated however that the noise cancellation aspects are not essential to the present embodiments, and the differences applicable to a non-noise cancellation headset will be discussed below.

Figure 2:
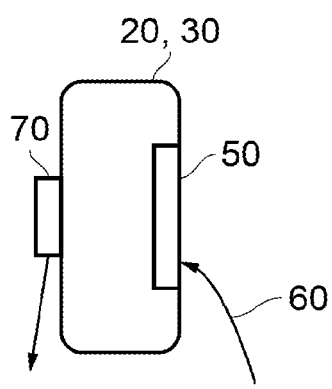
FIG. 2 schematically illustrates an earpiece for use in a headset similar to that shown in FIG. 1.

A microphone 70 detects ambient noises around the headset 10, and in particular generates a captured audio signal representing captured sounds from the users environment. The aim of a noise cancellation system is to pass a signal to the transducers 50 which depends upon the ambient noise but is in anti-phase with the noise. So, it is appropriate that the microphone 70 should be disposed near to the earpieces 20, 30. In one example shown in FIG. 2, a respective microphone 70 is mounted to each of the earpieces 20, 30 (only one earpiece being shown in FIG. 2 for clarity). In other embodiments, a microphone may be provided at another part of the system, for example as part of a control unit disposed partway along a cable providing the connections 60 to the transducers 50.

To provide noise cancellation, captured signals from the microphone (or microphones) 70 are passed to an amplifier 80 and an inverter 90 so as to provide an amplified and anti-phase version of the ambient noise. The amplifier and inverter therefore represent a noise reducing processor operable to generate an anti-phase version of an audio signal representing environmental noise, and to transmit the anti-phase version to the earpiece transducers for replay to the user. In a simple noise cancellation arrangement, the amplified and anti-phase signal is simply mixed with audio signals which are passed to the transducers 50 for reproduction. There are a few differences in respect of the present embodiments, and these will be described below. Note that in FIG. 1, the mixing function, in normal operation, is carried out by a controller 110 which will be described below. The controller 110 receives signals from the inverter 90 and also an input audio signal for reproduction by the headset. A user control (not shown) may be provided to allow the user to adjust one or both of: the gain of the amplifier 80; and the mixing proportions between the input audio signal and the output of the inverter 90.

The skilled person will appreciate that the term "noise cancellation" does not necessarily imply a complete cancellation or removal of ambient noise. Indeed, a 100% noise removal would be unlikely to be achieved. Instead, the term implies a noise reduction by at least a partial cancellation of at least some components of the ambient noise.

The amplifier 80 and inverter 90 need not necessarily be implemented as separate units; an amplifier could be used which, by virtue of standard features of its implementation, provides a phase-inverted output. It will also be appreciated that in arrangement such as that shown in FIG. 2, the noise cancellation system 85 comprising the amplifier 80 and the inverted 90 may be physically provided within the respective earpiece 20, 30.

In the present embodiments, noise cancellation is at least partially suspended in respect of certain categories of ambient noise.

A potential issue with a number of different types of so-called immersive devices such as noise-reduced headsets and head mountable displays is that they have the potential to occupy the whole of the user's attention. While this can be a desirable feature if the user is engaged in listing to a piece of music, or playing a video game, or watching a film, or trying to sleep on an aeroplane, it could mean that the user is prevented or inhibited from hearing sounds relating to potential safety hazards or other matters requiring attention in the vicinity of the user. Examples of the types of sounds which the user probably should hear but which may be inhibited by a noise reducing headset include alarm sounders such as fire alarm sounders, doorbells, other people wishing to gain the user's attention, crying babies and so on. In the present embodiments, various techniques are used to detect such sounds and allow the sounds to be brought to the users attention. In general terms, the characteristic sounds represent sounds of at least a threshold volume and/or having a characteristic frequency content, but these and other options are discussed below.

One way of achieving this is shown in FIG. 1, the headset is provided with a detector 100 and a controller 110. The detector 100 receives audio signals either from the microphone 70 or, if one is provided, from the amplifier 80. The detector 100 detects the presence, in the audio signal received by the detector 100, of particular categories of sound, or in other words the presence of any of a set of one or more characteristic sounds in the captured audio signal. Examples of detection techniques will be discussed below. In response to the detection of a sound within one of the particular categories, the controller 110 can carry out one or more of the following actions:

a) temporarily prevent or reduce the effect of noise cancellation, for example by inhibiting the mixing of the signal from the inverter 90 into signals to be passed to the transducers 50;

b) temporarily extinguish or reduce the level of the audio signal for reproduction which is passed to the transducers 50; and/or c) temporarily pass in-phase signals from the microphone 70, suitably amplified, to the transducers 50.

The controller is therefore operable to transmit the captured audio signal, at least in part, to the one or more transducers (or to allow the user to hear the users environment in a direct sense) in response to a detection that one or more of the set of characteristic sounds is present in the captured audio signal.

Accordingly, the controller acts as a mixer having three inputs: the anti-phase output from the inverter 90; the input audio signal for reproduction; and the in-phase amplified output from the microphone 70, provided by the detector 100. In normal operation, which is to say, when a particular sound has not been detected by the detector 100, the mixing function of the control 110 provides a mix between the input audio signal and the output of the inverter 90. As mentioned above, a user control may be provided to establish the relative levels of these two signals in normal operation, so as to give a noise cancellation or noise reduction function which is appropriate for that user.

When the detector 100 detects a particular sound which is to be brought to the users attention, the controller 110 can take one or more of the actions (a)-(c) listed above.

Action (a) is implemented by altering the mixing proportions applied by the controller 110 so as to reduce the proportion or level of the mix representing the output of the inverter 90. In turn, this reduces the cancellation of ambient noise which can allow the user to detect external noise is more easily, of course including the noise which is to be brought to the users attention.

Action (b) is implemented by altering the mixing proportions applied by the controller 110 so as to reduce the level of the input audio signal which is supplied to the transducers 50.

Action (c) is implemented by altering the mixing proportions applied by the controller 110 so as to increase (potentially from a normal value of zero) the level of the amplified in-phase signal derived from the microphone 70 in the signals supplied to the transducers 50.

Examples of the mixing levels applied by the controller 110 in the various different circumstances are shown in the following table, which uses linear rather than logarithmic indications of level, such that a level of "0" indicates that none of a signal is passed to the transducers 50 as part of the output mix of the controller 110, and a level of "1" indicates that the whole of the signal is passed to the transducers 50 as part of the output mix of the controller 110. Note also that as each of the actions (a)-(c) can be implemented independently, only those changes relevant to a particular action are indicated. Note also that the values shown below are purely for example purposes; other values could be used, and either a substantially instantaneous transition to the new value could be used, or a gradual transition over (say) 100 milliseconds could be applied, or the transition could be selected in dependence upon the type of noise (such as a fast transition for a fire alarm, or a slower transition for a baby crying).

|  | Main audio signal level | Anti-phase microphone level | In-phase microphone level |
| --- | --- | --- | --- |
| Normal Operation | 1 | 0.3 | 0 |
| Action (a) |  | → 0 |  |
| Action (b) | →0.3 |  |  |
| Action (c) |  |  | → 1 |

Any one or more of these actions, taken by the controller 110, will tend to emphasise the external noise in the category selected by the detector 100 in preference to the reproduction of the main audio signal.

It will be appreciated that an operation which is equivalent to increasing the mixer gain for the in-phase microphone level can be achieved simply by increasing the magnitude of the in-phase microphone signal which is passed to the mixer.

Other arrangements are possible. For example, the earpieces 20, 30 could comprise mechanical vents which are normally closed so as to inhibit sounds from reaching the user's ears, but which can open under the control of the controller 110 so as to allow external sounds to reach the user's ears. The vents could be, for example, spring-loaded so as to be held in a closed position by a latch, electromagnet or other holding arrangement against the influence of a spring or other resilient mount which would tend to open the vents. The controller 110 can cause the release of the holding arrangement so that the vents are released to move, under the influence of the spring or resilient mounting, to their open position. The user could manually return the vents to their latched-closed position after the detected sound has been attended to.

The arrangements are not limited to noise cancelling headsets of the type just described. Other headsets do not make use of active noise cancellation, but instead just inhibit ambient noise from reaching the user's ears by providing sound insulation as part of the earpieces 20, 30. The sound insulation may comprise a generally ring-shaped formation of flexible insulating material which provides a seal, in use, around the user's ears. In such examples, at least the inverter 90 is not provided, and the function of the amplifier 80 may be incorporated within the functionality of the detector 100.

In response to a detection of a sound in one of the categories detected by the detector 100, either or both of actions (b) and (c) listed above is relevant, and (purely by way of example) may lead to the following adjustments in mixing carried out by the controller:

|  | Main audio signal level | In-phase microphone level |
| --- | --- | --- |
| Normal Operation | 1 | 0 |
| Action (b) | →0.3 |  |
| Action (c) |  | → 1 |

The arrangement described above relating to movable mechanical vents is also relevant to this type of headset.

Note that some headsets may combine both types of arrangement, in that they may use active noise cancellation (using an amplifier 80 and an inverter 90) and may also make use of passive noise insulation techniques such as those described above.

Note also that the techniques described here can apply to devices such as head mountable displays, telephone handsfree headsets, helmets with built-in headsets, aviation headsets, electronic stethoscopes and the like, which make use of audio reproduction in such a way as to inhibit (passively, actively or both) ambient noise.

Figure 3:
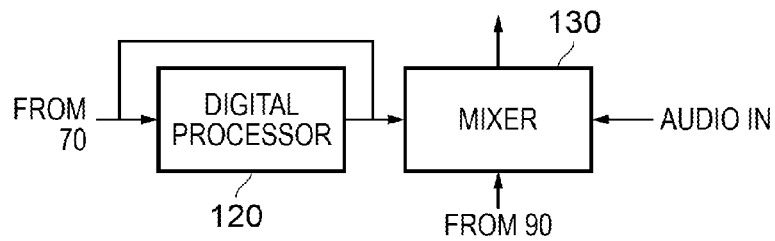
FIGS. 3-5 schematically illustrate possible detector-controller arrangements.
Figure 4:
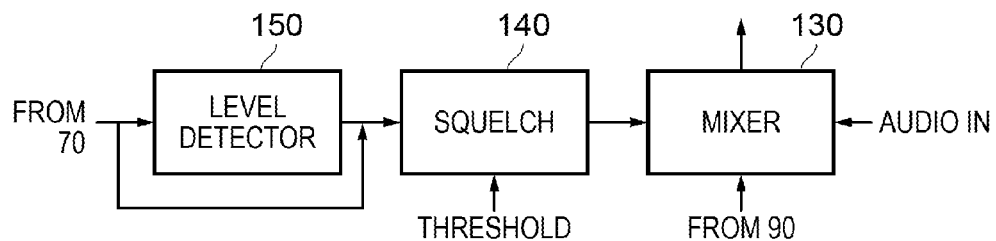
Figure 5:
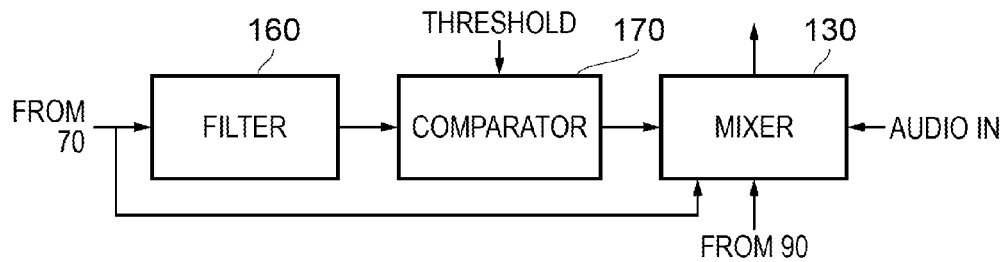

FIGS. 3-5 schematically illustrate possible detector and/or controller arrangements.

The arrangements of FIGS. 3-5 provide examples of some ways of detecting categories of external noise to be brought to the attention of the wearer of the headset using one or more of the techniques described above.

In FIG. 3, signals from the microphone 70 are passed to a digital processor 120 acting as the detector. The digital processor users known speech recognition techniques to detect the presence of speech within the signals captured by the microphone 70. If speech is detected, a mixer 130 (acting as part of the controller 110) is either controlled by the digital processor 122 increase its level for the signals from the microphone 70, or is supplied with an increased level microphone signal by the digital processor 120.

FIG. 4 uses a so-called "squelch" circuit or processor 140. This is a non-linear processor which acts under the control of a level detector 150 which in turn is responsive to the level of the signal from the microphone 70. When the signal level is below a threshold, the squelch circuit 140 does not pass the microphone signal to the mixer 130. When the signal level as detected by the level detector 150 is above the threshold, the squelch circuit 140 passes the microphone signal to the mixer 130. The combination of the squelch operation and the mixing operation mean that ambient noise of more than a threshold volume is passed to the mixer to be mixed into the signals supplied to the transducers 50, whereas ambient noise below the threshold volume is not passed to the mixer.

FIG. 5 illustrates a filter 160 such as a band-pass filter, the output of which is supplied to a comparator 170 which compares the filter output with a threshold value. The comparator 170 controls the operation of the mixer 130 according to any one or more of the actions (a)-(c) discussed above, so as to preferentially pass the microphone signal representing the in-phase external noise when the filtered microphone signal is detected by the comparator 170 to exceed a threshold signal level.

Figure 6:
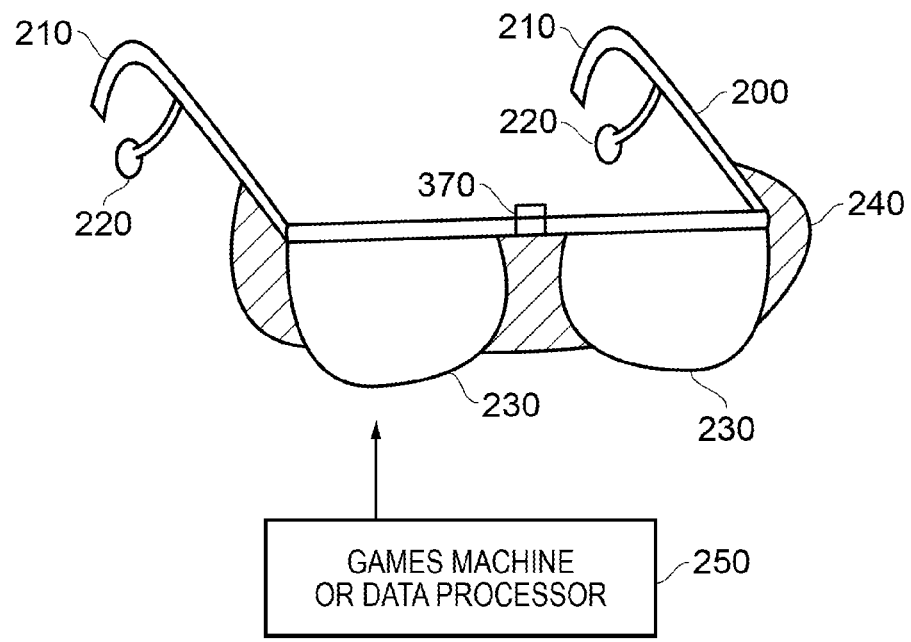
FIG. 6 schematically illustrates a head mountable display (HMD)

FIG. 6 schematically illustrates a head mountable display (HMD).

The HMD of FIG. 6 comprises a frame 200 including portions 210 which can secure the frame to the ears of the user, earpieces 220, display portions 230 and masking portions 242 excluded some or all ambient light from the user's eyes while the user is operating the HMD. The display portions 230 and the earpieces 220 are supplied with video and audio signals for reproduction by a games machine or data processor 250. Accordingly, the HMD of FIG. 6 represents an example of an HMD having a frame to be mounted onto an observers head, the frame defining one or two eye display positions which, in use, are positioned for viewing by the observer. In embodiments of the invention the frame also comprises one or more shutters for normally obscuring the observer's view of the surrounding real environment. A display element may be mounted with respect to each of the eye display positions, the display element providing a virtual image of a video display of a video signal from a video signal source to the observer.

The earpieces 220 may form part of a system corresponding to that described with reference to FIGS. 1-5. In this regard, the microphone or microphones 70 may be mounted anywhere on or with respect to the frame 200 and/or the earpieces 220 so as to capture ambient sounds in the vicinity of the user while the user is wearing the HMD. The functions of the detector 100 and the controller 110 may be provided by electronics mounted on or with respect to the frame 200 or by functionality of the games machine or data processor 250. The games machine or data processor 250 may communicate with the HMD by a wired or wireless connection.

Of course, the HMD of FIG. 6 does not necessarily need to provide the noise-handling functionality described with reference to FIGS. 1-5.

The HMD shown in FIG. 6 provides images for display to the users eyes in such a way that the user can see only the displayed images (or at least, the displayed images form the predominant part of the user's view). The masking portions 240 help to achieve this by reducing the amount of ambient light incident upon the users eyes. The display portions 230 themselves are opaque in that they do not pass ambient light to the user' eyes. So, the act of viewing images on the display portions 230 is another example of a substantially immersive experience for the user, in that the user is at least inhibited from seeing other things which would otherwise be visible in the vicinity of the user.

The display portions 230 are physically very close to the user's eyes. However, the user is actually able to view a virtual image in respect of each display portion 230, the virtual image being significantly larger than the actual physical size of the display portion 230 (or a display element forming an active part of the display portion 230) and being significantly further away than the distance between the eye and the display element of the display portion 230.

Figure 7:
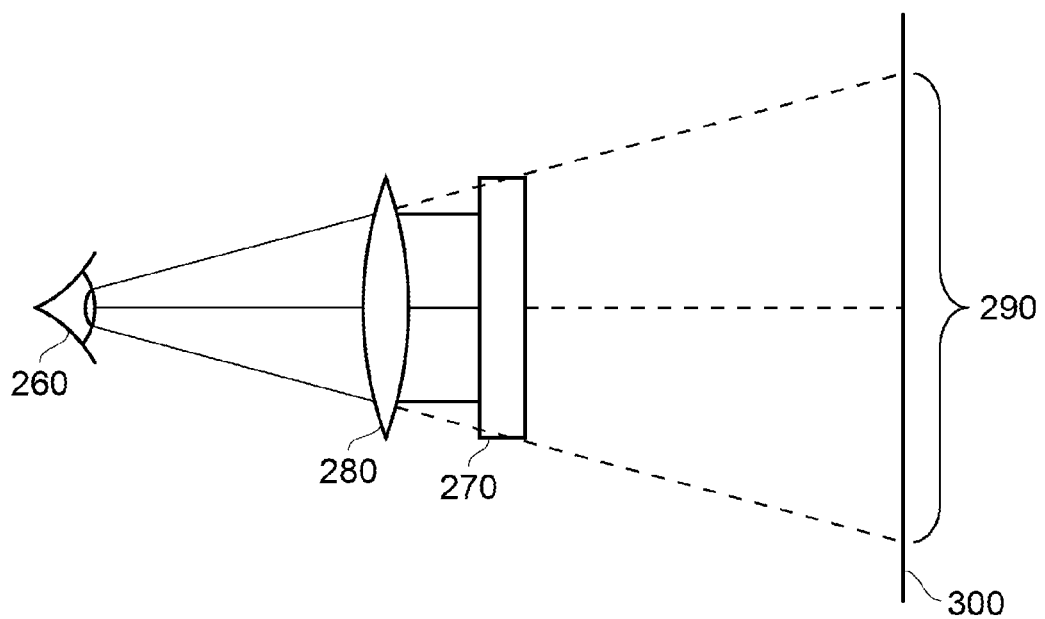
FIG. 7 schematically illustrates the generation of a virtual image.

FIG. 7 schematically illustrates the generation of a virtual image. The user's eye 260 views an image presented on a display element 270 through a lens arrangement 280. The lens arrangement 280 is shown for schematically this is as a single convex lens, but of course could be a compound or more complex arrangement of lenses and optical elements. Using known techniques, the effect of the lens arrangement 280 is to provide the user with a view of a virtual image 290 on a virtual image plane 300 separated from the users eye by a distance of, for example, 3 m. In general terms, embodiments of the invention the virtual image is generated at a distance of more than 1 m from the HMD frame.

In a similar way to the audio embodiments discussed above, and aim of the present embodiments is to detect visual events of a type categorised such that the user should be informed of the occurrence of those events, and then to provide a technique for allowing the user to be notified of such an occurrence.

As an example, if a moving object approaches to within a threshold distance of the user's head (and/or approaches at least a threshold rate), it is appropriate that the user should be made aware of the moving object to avoid any possibility of injury. Here, it is noted that the immersive nature of the viewing of image or video material using the HMD of FIG. 6 means that without techniques such as the ones to be described below, the user may not notice the moving object approaching the users head. Other types of occurrence which may be notified to the user, and techniques for notifying the use of such occurrences, will be discussed below.

Accordingly, embodiments of the invention provide an object detector for detecting the presence of an object within a detection range of the observer's head, for example by detecting an object approaching the head, and a controller for controlling operation of the HMD so as to allow the observer to view at least a portion of the surrounding real environment in response to a detection of the presence of an object within the detection range, which may represent the detection of an object approaching the head.

FIG. 8 schematically illustrates a movable shutter used in some embodiments of the present invention. The movable shutter 310 forms a front (outer) face of the display portion 230 and provides at least some of the light-obscuring functions of the display portion 230. An actuator 320 controls movement of the movable shutter 310 between a view-obscuring position 330 and a non-obscuring (or less-obscuring) position 340 so that in the non-obscuring or less obscuring position the user may view at least a portion of the surrounding real environment. There are various ways of achieving this movement. In some embodiments, the actuator 320 may be a motor drive or an electromagnetic drive operable to move the movable shutter 310 in either direction, that is, from the position 330 to the position 340 or from the position 340 to the position 330. However, noting that this arrangement may use excessive electrical power in the context of what is possibly a battery-powered HMD, and also noting that the arrangement may provide a time lag between a detection being made that the user's view should be unobscured and the actual unobscuring taking place, in another type of embodiment the actuator 320 comprises a spring or other resilient element operable to move the movable shutter 310 from the obscuring position 330 to the non-obscuring position 340, and a latching mechanism such as a mechanical or electromagnetic latch, releasable under electrical control, to hold the movable shutter 310 against the operation of the resilient element in the position 330.

FIG. 9 schematically illustrates an electrically alterable shutter as another type of arrangement. Here, the display portion 230 comprises a region of a material 350 having an electrically alterable optical transmission, which can be varied between a more opaque state (a view obscuring mode) and a less opaque state (a view allowing state) in response to an electrical signal 360 generated by the controller.

In a further possible arrangement, a camera 370 such as a forward-facing camera may be provided as part of the HMD. In order to selectively provide the user with a view of his environment in response to the detection of a hazard or other occurrence, instead of changing the opacity of the HMD, and image of the surrounding environment can be selectively displayed by the display portions 230 based on images captured by the camera 370.

Techniques for generating an electrical signal to control these types of arrangements will now be described.

Figure 10:
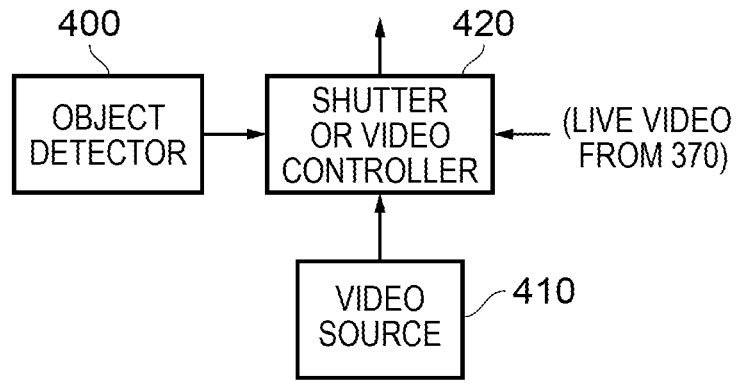
FIG. 10 schematically illustrates the control of video reproduction in an HMD in dependence upon object detection.

FIG. 10 schematically illustrates the control of video reproduction in an HMD in dependence upon object detection. In FIG. 10 a generic object detector 400 is illustrated. Possible configurations of the object detector 400 will be discussed below. A video source 410 represents the source of image or video material to be displayed by the display portions 230. For example, the video source 410 may be embodied by the games machine or data processor 250. A shutter or video controller 420 provides the control to change the nature of the display portions 230 between an obscuring and a non-obscuring configuration (in the case of variable shuttering as described with reference to FIGS. 8 and 9) or to change the type of video material which is displayed by the display portions in the case of systems using an HMD-mounted camera such as the camera 370.

In particular, if the object detector 400 detects an object within a certain distance and/or positional relationship with respect to the HMD, then if a shuttering system is used, the shutter or video controller 420 controls the shuttering system to change to a less obscuring or less opaque condition so that the user can see (at least in part) the user's external environment. If a camera such as the camera 370 is used, then in response to detection of an object as described above, the shutter or video controller 420 can control the display portions 232 display video received from the camera 370 in preference to video received from the video source 410. Note that the transition between the two video sources does not need to be absolute; the video from the camera 370 can be mixed with the video from the video source 410. The mixing may be on a special basis, so that the video from the camera 370 is inserted into a portion of the displayed image, similar to a picture-in-picture system. All the mixing can be such that the video from the camera 370 is superimposed over the video from the video source 410.

FIG. 11 schematically illustrates a camera-based object detection arrangement, for example making use of the camera 370 forming part of the HMD of FIG. 6. Accordingly, embodiments of the invention provide a camera mounted sellers to move with the frame of the HMD, and an image comparator operable to compare successive images captured by the camera so as to detect the presence, in a captured image, of an object that was not at that image position in a previously captured image.

Images from the camera 370 are passed to an image comparator 430 and an image buffer 440. The image buffer 440 stores the captured images so that the image comparator 430 may compare a current captured image with one or more previously captured images so as to detect image differences. The image differences may be compared with a threshold. This can be done in various different ways. For example, a sum of absolute pixel value differences may be detected with respect to the whole image or one or more sub-portions of the image, as a comparison with a previous image. The sum of absolute pixel value differences gives a single variable indicative of image difference, which can be compared with the threshold. As an alternative, in order to detect an object approaching the user within view of the camera 370, image differences can be detected in such a way as to detect a region of the image which grows over the course of several images (for example, five images). The size of the detected region in the fifth image divided by the size of the detected region in the first image (of the group of five images up to and including a current image) provides a single variable indicative of the approach of an object, which again can be compared with the threshold. In either case, exceeding the threshold is indicative of a detection of an approaching object, with the detection being passed to the shutter or video controller of FIG. 10.

Note that the images captured by the camera may be translated, before the comparison takes place for object detection, so as to avoid incorrect object detections caused simply by movement of the HMD between captured images. The translation can be in response to detected motion of the HMD so as to aim to cancel that motion out from the image comparison. The motion may in turn be detected by one or more motion detectors separate to the camera (such as an accelerometer at the HMD) or may be detected by detecting image motion of fixed points (or at least points which have been present and stationary in multiple captured images) such as parts of the image background.

FIG. 12 schematically illustrates an emitter-receiver based object detection arrangement. Here, an emitter 450 emits a detection signal which is received after reflection from an approaching object by a receiver 460. The process can be controlled by a detector 470 which controls the timing of emissions by the emitter 450 and detects the level of signals received by the receiver 460. The emitted and received signals may be, for example, ultrasonic signals, radio-frequency signals, infrared signals or the like.

Figure 13:
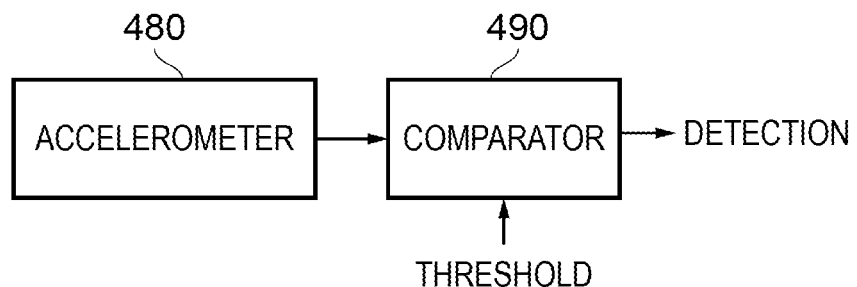
FIG. 13 schematically illustrates an accelerometer-based detection arrangement.

FIG. 13 schematically illustrates an accelerometer-based detection arrangement. Here, a detection is made of sudden motion of the user, and in particular sudden motion of the users head (assuming the user is wearing the HMD on his head), represented for example by detection of a predetermined characteristic motion. This is not the same as detecting an approaching object, but can indicate a situation in which the user should be allowed to see the external environment to avoid a possible hazardous situation. This type of detection can be used in place of the object detection carried out by the object detector 400 of FIG. 10, or can be used in addition to the object detection, for example by combining the detection output of the arrangement of FIG. 13 with the detection output of the object detector 400 by a logical OR operation.

Referring to FIG. 13, an accelerometer 480 is mounted with respect to the HMD of FIG. 6 so that movements of the HMD are detected by the accelerometer 480. A comparator 490 compares the detected accelerations with a threshold value. If the magnitude of the detected acceleration is greater than the threshold value, a detection is made of a potentially hazardous situation and the shutter or video controller 420 is controlled to allow the user to see the external environment. In a virtual reality arrangement, the video signal source can be operable to provide a video signal for display having an apparent viewpoint which is dependent upon the detected motion.

In other embodiments, motion detection may be carried out by using a camera mounted so as to move with the frame of the head mountable display; and an image comparator operable to compare successive images captured by the camera so as to detect inter-image motion.

Figure 14:
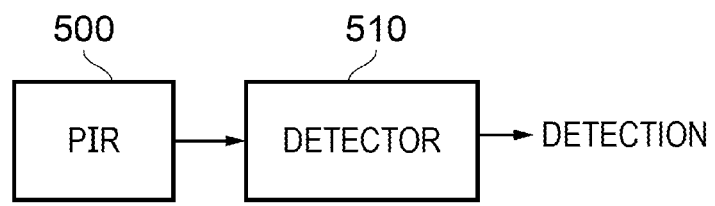
FIG. 14 schematically illustrates a passive infrared detection system.

FIG. 14 schematically illustrates a passive infrared detection system as another example of an object detector 400. A known passive infrared (PIR) head end 500 is associated with a motion detector 510 and mounted with respect to the HMD so as to detect an approaching object.

It will be appreciated that the detection techniques described above are not mutually exclusive, and that they can be combined in any combination.

Figure 15:
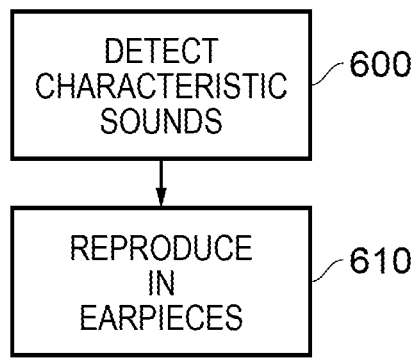
FIG. 15 is a schematic flowchart illustrating the operation of the headset of FIG. 1 or the HMD of FIG. 6 in respect of the reproduction of audio signals.

FIG. 15 is a schematic flowchart illustrating the operation of the headset of FIG. 1 or the HMD of FIG. 6 in respect of the reproduction of audio signals.

At a step 600, characteristic sounds which should be made available to the user are detected in the ambient environment external to the user. In instances where one or more of those sounds are detected in a captured audio signal, at a step 610 the detected sounds are preferentially reproduced in the earpiece or earpieces so that the user may hear them.

Figure 16:
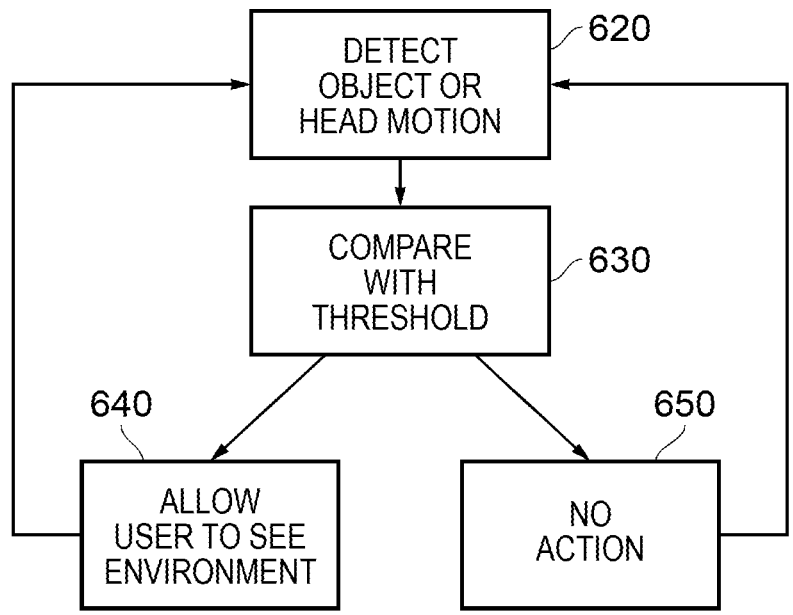
FIG. 16 is a schematic flowchart illustrating the operation of the HMD of FIG. 6 in respect of the reproduction of video signals.

FIG. 16 is a schematic flowchart illustrating the operation of the HMD of FIG. 6 in respect of the reproduction of video signals.

At a step 620, a detection is made of an approaching object or of motion of the user's head or both. At a step 630, the object size or speed, or the head motion, compared with a threshold. If the motion or the object size or speed are greater than the threshold then the user is allowed to see the external environment at a step 640. Otherwise, as a step 650, no change is made to the user's view.

It will be appreciated that in an immersive environment such as that described above, very sudden changes could be disconcerting to the user and could even exacerbate a potentially hazardous situation. Steps can be taken to alleviate this potential problem. For example, if the user is viewing a video game involving moving action, such as a car racing game, then the object detector 400 could instruct the games machine 250 to cause the users in-game motion to be brought to a halt before the external environment is allowed to be seen by the user. As another example, changes can be made gradually, for example over a period of 100 ms, to allow the user to become accustomed to the transition from the immersive virtual environment to the view of the real external (surrounding) environment.

Other techniques for notifying the user are also possible. For example instead of reproducing video of the external environment on the display portions 230, warning messages such as "take the HMD off now" could be displayed by the display portions 230. In other alternatives, instead of changing the user's view, a warning message could be provided through the earpieces 220 as an audible warning, such as "sit down now". Further options will be discussed below in connection with FIGS. 23-25.

Figure 17:
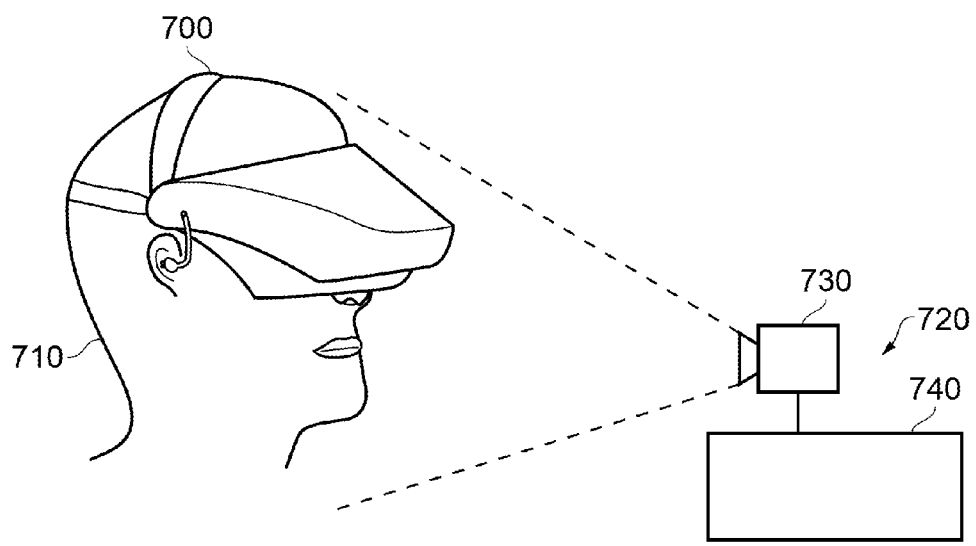
FIG. 17 schematically illustrates a data processing system comprising an HMD and a camera arrangement.

FIG. 17 schematically listless the data-processing system comprising an HMD 700 worn by a user 710, and a camera arrangement 720 comprising a depth camera and microphone array 730 and a processor unit 740.

The depth camera and microphone array 730 captures images of the environment in which the user 710 is positioned. In embodiments of the invention, one or more optical markers may be mounted with respect to the HMD 700 in order to allow the processor unit 740 to distinguish the position of the HMD 700 in the captured images. For example, such an optical marker might be a passive markers such as a coloured shape or could be an active markers such as a light emitting diode (LED) which could be continuously or intermittently illuminated. Intermittent illumination could be used in order to encode an identity of the HMD and/or of the user by means of a pulse coded illumination signal. In other arrangements, the colour of the optical marker could indicate an identity of the HMD and/or of the user. In some examples, the LED may be an infrared LED, generating light which is invisible to the human eye. One or more optical markers may be used. Depending upon the particular application of the HMD, it may be a normal expectation that the user wearing the HMD faces in the general direction of the camera 730, but in other applications and order to allow for the user turning his head to face a different direction, multiple optical markers may be spaced around the periphery of the HMD so that at least one optical marker may be observed whatever the current orientation of the users head while wearing the HMD.

The processor 740 may be implemented as, for example, a Sony® PlayStation 3® games console running appropriate firmware and/or software.

The depth camera and microphone array 730 and the processor unit 740 cooperate to process images captured by the depth camera and to identify the position in 3-D space of the user wearing the HMD. As mentioned above, this may be by analysis of the images to detect the position of optical markers in the captured images.

Figure 18:
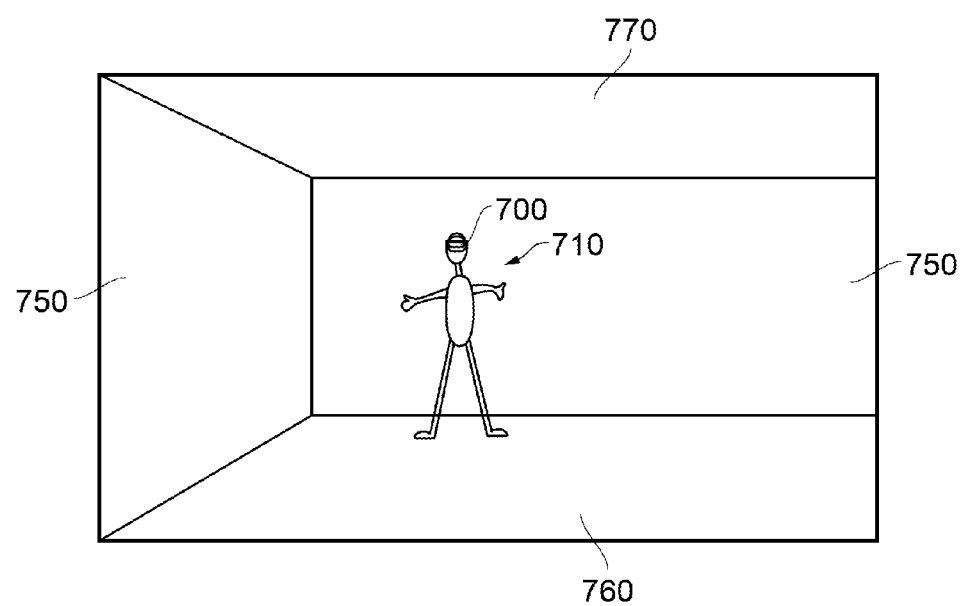
FIG. 18 schematically illustrates an image captured by the camera arrangement of FIG. 17.

FIG. 18 schematically illustrates an example image as captured by the camera arrangement 720 of FIG. 17. This example image shows a portion of a room with walls 750, for 760 and ceiling 770, while and the user 710 wearing the HMD 700 within the room.

In example arrangements, the images captured by the camera arrangement 720 may be used to provide an indication of a possible need to allow the user to experience either or both of the ambient or surrounding audio or visual environment. In this regard, the images captured by the camera arrangement 720 may supplement or replace either or both of the proximity detection and audio detection arrangements discussed above. Techniques by which this can be performed will be discussed below.

Similar functions may be carried out using audio signals captured by the camera arrangement 720. Again, techniques by which this may be performed will be discussed below.

Figure 19:
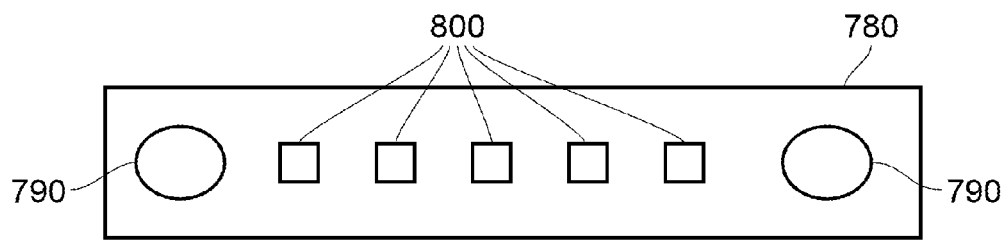
FIG. 19 schematically illustrates a stereoscopic camera and microphone array.

FIG. 19 schematically illustrates a stereoscopic camera and microphone array, providing an example of the depth camera and microphone array 730 of FIG. 17.

The arrangement shown in FIG. 19 comprises a casing 780 holding two laterally spaced cameras 790 and five (in this example) laterally spaced microphones 800.

The cameras 790 cooperate together to capture stereoscopic images. Depth information can be derived using known techniques from such stereoscopic images by analysis of parallax between the images captured at the spaced apart positions. Note that other types of depth camera are available and are suitable for use in respect of the present techniques. For example, a depth camera may include a light source which projects an array of so-called structured light (in one basic example, a pattern such as a grid) onto the scene to be captured. The depth, or at least relative depth, of items in the scene may be detected by detecting, in the captured image, distortions of the light pattern. The light projected by the camera may be, for example, infra-red illumination and therefore invisible to the user. A separate camera element may be used to capture the light pattern, which then allows the main image to be captured using a camera element which can be made (using filters or the like) insensitive to the wavelength (s) used to project the patterned light. In another example arrangement, an ultrasonic or radio frequency radar-like detector can be associated with a camera element, so as to capture depth information to be associated with the captured image data. Note also that if depth information is not used, and only lateral separation is used in the object detection processes described below, a 2D camera (not detecting depth) can be used instead of a depth camera.

Accordingly, it will be understood that techniques other than the use of stereoscopic cameras are also applicable to embodiments of the present invention.

It will also be appreciated that although the camera and microphone array 730 are described in this example as a single unit, embodiments of the invention can operate with just a camera (if audio detection is not used) or with just a microphone or microphone array (if image based detection is not used).

The microphones 800 can operate as a phased array of microphones. This operation will now be explained briefly in connection with FIG. 20 which, just for clarity of the diagram, shows two example microphones.

Figure 20:
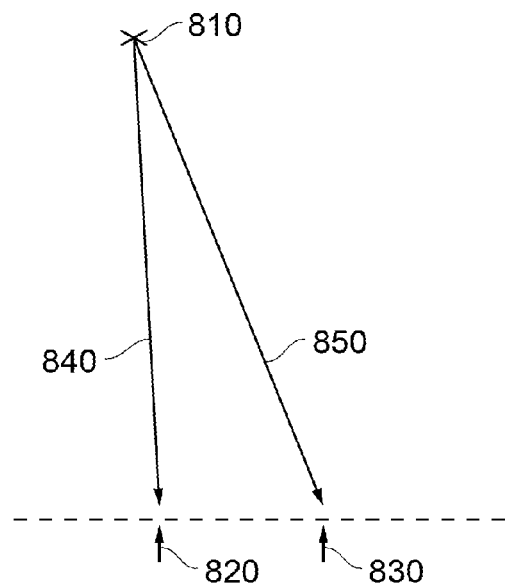
FIG. 20 schematically illustrates the operation of a microphone array.

Referring to FIG. 20, a sound source at a particular position 810 is detected by spaced apart microphones at respective positions 820, 830. A difference in audio phase will be detected between the different microphones because of the different lengths of the audio paths 840, 850 from the sound source at the position 810 to each of the microphones. If more microphones are used, a different respective audio path will apply in respect of each of the microphones. This allows various different modes of operation. In one example, an estimate of the position of the sound source relative to the microphone array may be generated by detecting the various phase differences for the same sound as received by different ones of the spaced apart microphones in the array. In another example, the microphone array may be used to preferentially detect sounds from a source at or near a certain spatial position by applying a respective phase delay to the signals received by each of the microphones in the array and summing the results, the phase delays cancelling out the phase differences which would apply to sounds arriving at each microphone from a source at the required position. This latter arrangement will tend to give destructive interference in respect of a sound source not at the required position and constructive interference in respect of a sound source at the required position. So, the microphone array may be used for position detection or for at least partially isolating sounds generated by sources at particular spatial positions.

In other embodiments, it will be appreciated that a single microphone element could be used. A single element would not generally allow for directional or spatial information relating to the source of a sound to be detected, but would allow for the capture of ambient sounds in the vicinity of the user wearing the HMD.

In other examples, instead of a phased array of microphones, an array of directional microphones could be used, such that each one is pointed towards a different respective direction. The direction, relative to the microphone array, of a sound source can then be detected by detecting which of the microphones provides the greatest magnitude audio signal relating to a particular sound. A sound source in a particular direction can be selected by selecting the signal from a required one of the microphones. So, it will be understood that alternatives to a phased array of microphones are envisaged within the scope of embodiments of the present invention.

Figure 21:
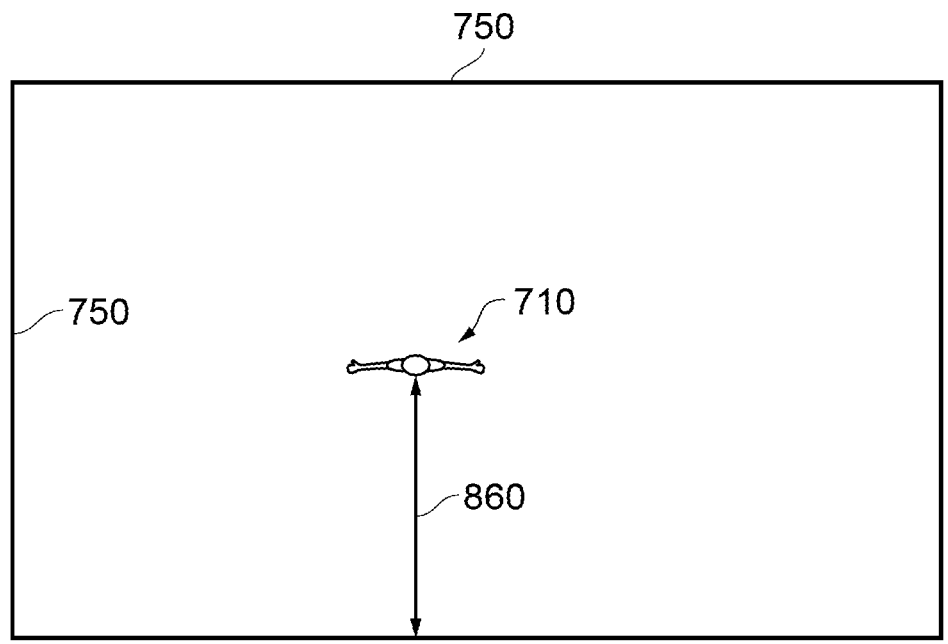
FIG. 21 schematically illustrates a plan view of a room.

As mentioned above, the stereoscopic images captured by the cameras 790 may be analysed using known techniques to derive depth information in respect of the environment as viewed by the cameras. FIG. 21 schematically illustrates a plan view of a room containing the user 710. In order to compare the room of FIG. 21 with the room of FIG. 18, it should be assumed that the depth camera is positioned at the bottom edge of the plan view of FIG. 21, looking in towards the room. The depth information associated with the captured images, for example information defining a distance 860 between the depth camera and the user, can be encoded and handled as, for example, a depth value associated with each pixel of the captured image of FIG. 18.

Figure 22:
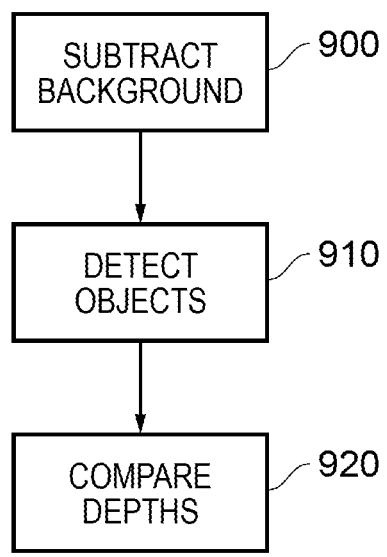
FIG. 22 is a schematic flow chart of operations involved in detecting another object near a wearer of an HMD.

FIG. 22 is a schematic flowchart of operations involved in detecting another object or person near a wearer of an HMD. The operations of FIG. 22 relate first to the differentiation of fixed parts of the scene as viewed by the camera (the background such as walls, furniture and the like) and variable parts of the scene such as the user 710 and any approaching objects or people.

The background of the image is detected in one of two example ways. In a first example, the user may instruct the camera to capture an image of the room or other background without the user present (for example because the user is positioned behind the camera at the time of capturing this image). This would form a background image for use in later comparisons with foreground objects. In a second example, the system may detect those parts of the image which are present and unchanged at plural sample image points spread out in time. So, even if the user moves around, uncovering and covering areas of the background, those background errors will remain the same before and after their covering and uncovering.

Referring to FIG. 22, in respect of a particular 3-D image as captured, as a step 900 the processor 740 subtracts the background image from the current captured image. This leaves a residual image representing changeable items such as the image of the user 710. At a step 910, the processor 740 detects objects in the captured image including the HMD 700 and any nearby objects. Here, the HMD 700 may be identified by the optical markers discussed above, and an object may be identified as a nearby object if (i) there is a region of background image between that object and the HMD 700, and (ii) the nearby object is not itself part of the background, and (iii) the nearby object is within a threshold distance to the HMD 700. The test relating to criterion (iii) is carried out at a step 920 in FIG. 22.

The detection of whether the object is within a threshold distance (which may be considered as a detection range) of the user's head may be carried out in various ways. For example, in an arrangement in which depth information is available in association with a captured image, the lateral displacement of an object relative to the user's head may be detected by detecting the lateral separation in the captured image between the detected object and the detected HMD position. Here, lateral may refer to horizontal, vertical or radial distance as detected in the plane of the image. The depth separation may be detected by detecting, from the depth data, the absolute difference between the detected depth of the HMD and the detected depth of the object.

The comparison with a threshold distance may be carried out by combining the lateral and depth displacements to obtain a single radial distance between the object and the HMD. For example, if the detected depth of the HMD is Dz (in meters), relative depth displacement is Lz (measured in meters, for example) and the relative horizontal and vertical displacements are Nx and Ny (measured in pixels), the field of view of the camera is FOV degrees and the pixel resolution of the captured image is Px·Py pixels (horizontal×vertical), then the following analysis may be considered as an example of the present techniques:

(a) derive a horizontal lateral displacement, Lx, in meters: angular horizontal displacement is approximately (Nx·FOV)/Px lateral displacement in meters is approximately Dz·sin(angular displacement) for small displacements, this approximates to Dz·(angular displacement) so an approximation of Lx is:
Lx=Dz·Nx·FOV/Px=Dz·Nx·Cx, where Cx is a constant for the camera arrangement in use.

(b) similarly, derive an approximation of the vertical lateral displacement, Ly, in meters: Ly=Dz·Ny·Cy, again where Cy is a constant for that camera arrangement.

(c) derive a radial separation R between the detected object and the HMD: $R=\sqrt{(Lx^2+Ly^2+Lz^2)}$ (d) compare R with a threshold value representing the detection range.

A single lateral displacement Lr may be derived instead of separate horizontal and vertical displacements, in dependence upon a number of pixels along the shortest line, in the image, between the detected object and the HMD. Here, a replacement formula at step (c) could be $R=\sqrt{(Lr^2+Lz^2)}$ The comparison with a threshold distance may instead be carried out separately in respect of lateral and depth displacements. Here, the lateral displacement Lr may be a radial lateral displacement in the image either derived by combining Lx and Ly as $\sqrt{(Lx^2+Ly^2)}$ or measured directly as just described. The comparison with a threshold could detect whether either the lateral displacement Lr or the depth displacement Lz is less than a respective threshold, or could alternatively detect whether both the lateral displacement Lr and the depth displacement Lz are less than respective thresholds. The respective thresholds could be the same or different.

If an object is detected as being near to the HMD 700, this triggers the steps of FIG. 16, with control passing to the step 630 at which the object size or speed is compared with a threshold, and the remainder of FIG. 16 is performed according to the results of that test.

Referring also to FIG. 15, the detection relating to the step 600 can be carried out by microphones 800 of the microphone array as shown in FIG. 19.

Figure 23:
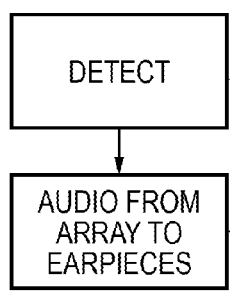
FIGS. 23 to 25 are schematic flowcharts illustrating operations carried out in response to a detection.
Figure 24:
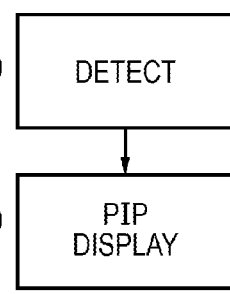
Figure 25:
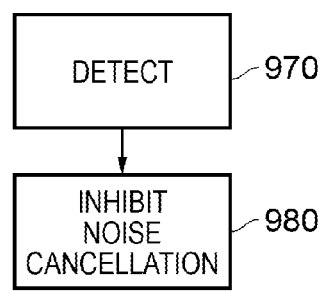

FIGS. 23 to 25 schematic flowchart illustrating operations carried out in response to a detection. Here, the term "detection" relates to the steps 930, 950 and 970 of FIGS. 23 to 25, and is generic to a detection of an approaching object, a detection of a characteristic head movement, a detection of a characteristic sound or the like, all as discussed in detail above. In respect of FIG. 23, a response to such a detection may include passing audio signals detected by the array of microphones 800 to the earpieces of the HMD. In FIG. 24, a response to such a detection may include displaying a picture-in-picture (PIP) display so that an image of the surroundings (captured by a camera forming part of the HMD, the cameras 790 or both) is displayed as a sub-image or a partial image within the overall display provided to the user by the HMD. In FIG. 25, a response to such a detection may include inhibiting a noise cancellation function relating to the earpieces associated with the HMD (noting that the earpieces may form part of the HMD or maybe part of a separately worn headset).

Accordingly, embodiments of the invention can relate to a head mountable display system comprising an HMD (such as the HMD 700 of FIG. 17 or an HMD as described earlier) and, separate to the HMD itself, an object detector for detecting the presence of an object within a detection range of the observer's head and a controller for controlling operation of the HMD so as to allow the observer to view at least a portion of the surrounding real environment in response to detection of the presence of an object within the detection range. The camera arrangement 720 comprising the camera and microphone array 730 and the processor 740 provide an example of the object detector and the controller, in this context. Note however that even in the context of a separate camera, the function of the controller (and indeed of the object detector) could be implemented at least in part by processing carried out at the HMD. A significant technical feature in these embodiments is that the camera is separate to the HMD and is positioned so that, in use, it captures images of the HMD. In embodiments of the invention, the camera may be a depth camera (such as a stereoscopic camera as discussed above) configured to detect depth information associated with a captured image, though other alternatives have been described.

In embodiments of the invention the object detector is configured so as to detect the presence of an object within a detection range of the observer's head. In the case of object detectors forming part of the HMD arrangement itself (such as a passive infra-red detector or the like), the detection range may be considered as relating to a range from the object detector itself. In the case of embodiments by which object detection is carried out using a separate camera such as by using the camera arrangement 720, the detection range may be considered as a threshold range detected by image and/or depth data analysis (laterally, in a depth direction, or in a radial direction relative to the detected position of the user's head derived from the lateral and depth displacements).

Other embodiments of an HMD system could incorporate the object detector and controller functions (or at least parts of these functions) in the HMD itself, as described earlier.

It will be appreciated that various cameras and camera functions are described in the present specification. The HMD itself may have an HMD camera which (a) captures images for the surroundings of the HMD, for possible display to the user, and/or (b) contributes to the detection of HMD motion as discussed above. These functions may be carried out using separate HMD cameras or by the same HMD camera. More than one HMD camera may be involved in either or both functions. The HMD may have no cameras. A different camera, such as that provided by the camera arrangement 720, may be provided so as to provide images of the HMD in use. This camera may be used for object detection as discussed above. In some embodiments, images captured by the separate camera may be used as images of the surroundings to be displayed to the user. More than one separate camera may be used. No separate camera could be used. In the broadest aspects of the present embodiments, the question of whether a camera is part of the HMD or is a separate camera is not material. In more detailed expressions of the present embodiments, a camera may be considered as an HMD camera (forming part of and/or mounted on the HMD) or a non-HMD or separate camera.

Similarly, in respect of an audio in which transmit captured audio signals to one or more transducers in response to a detection of one or more characteristic sounds in a captured audio signal, the microphone array (or other separate microphone or microphones not forming part of the HMD) could be used for either or both of (a) capturing an audio signal in which characteristic sounds are detected, and (b) providing an audio signal to be routed to the earpieces in case of such a detection. Accordingly, in examples of an audio system, all of the functionality may be provided at the headset, whereas in other examples, some of the functionality, including optionally some or all of the microphone functionality, may be provided at a separate unit or units. In such a case, the camera arrangement 720 may provide an example of a microphone, and some or all processing may optionally be carried out at the processor 740. Again, in the broadest aspects of the present technique, the choice of where the microphone or microphones is/are positioned, and the choice of where the processing takes place, as between the headset and a separate unit or units, are not material. In more closely defined arrangements, a microphone can be defined as a headset microphone or a separate microphone. Note that the headset may be an HMD, or alternatively may not have any display capabilities.

A controller may be operable to transmit sounds from the user's environment to the user in response to a detection that one or more of the set of characteristic sounds is present in the captured audio signal. This could be by transmitting the captured audio signal from which the characteristic sounds were detected, to the user's earpieces. it could be by transmitting a separately captured audio signal to the user's earpieces. So, for example, the detection and the user listening could be in respect of the same audio signal (captured by an HMD microphone or by a separate microphone). Alternatively, the detection could be in respect of an audio signal captured by one microphone (for example, a separate microphone) but the transmission to the user's earpieces could be in respect of an audio signal captured by another microphone (such as an HMD microphone). In further arrangements, the transmission to the user could be implemented simply by temporarily inhibiting the operation of a noise cancellation arrangement.

It will be appreciated that embodiments of the invention may be implemented, at least in part, by software-controlled data processing apparatus. In such cases, the software, and a medium by which the software is provided, for example a non-transitory machine-readable storage medium such as a magnetic or optical disc medium or a non-volatile memory, are also envisaged as embodiments of the present invention.

It will be apparent that numerous modifications and variations of the present disclosure are possible in light of the above teachings. It is therefore to be understood that within the scope of the appended claims, the invention may be practised otherwise than as specifically described herein.

The invention claimed is:

1. An audio system comprising:
   a headset comprising a pair of earpieces positionable with respect to a user's ears so that, in use, the user is inhibited from hearing sounds from the user's environment, at least one of the earpieces having a transducer for reproducing sounds from an input audio signal;
   a microphone for generating a captured audio signal representing captured sounds from the user's environment;
   a first detector for detecting the presence of any of a set of one or more characteristic sounds in the captured audio signal;
   a controller operable to transmit sounds from the user's environment to the user in response to a detection that one or more of the set of characteristic sounds is present in the captured audio signal;
   a camera positioned apart from the headset so as to capture images of the headset; and
   an object detector being configured to detect, from images captured by the camera, an object approaching the headset wearer's head.

2. The system according to claim 1, in which both earpieces comprise a respective transducer, the transducers being connectable to an audio signal source.

3. The system according to claim 1, in which the earpieces each comprise sound insulating formations to inhibit transmission of sound from the environment to the user's ears.

4. The system according to claim 1, comprising a noise reducing processor operable to generate an anti-phase version of an audio signal representing environmental noise, and to transmit the anti-phase version to the transducers for replay to the user.

5. The system according to claim 4, in which the microphone is operable to capture the audio signal representing environmental noise.

6. The system according to claim 1, in which the first detector is operable to detect sounds of at least a threshold volume and/or having a characteristic frequency content.

7. The system according to claim 1, in which the microphone is separate to the headset and is positioned apart from the headset.

8. The system according to claim 7, in which the microphone comprises a phased microphone array.

9. A method of operation of an audio system comprising a headset comprising a pair of earpieces positionable with respect to a user's ears so that, in use, the user is inhibited from hearing sounds from the user's environment, at least one of the earpieces having a transducer for reproducing sounds from an input audio signal, the method comprising:
   generating a captured audio signal representing captured sounds from the user's environment;
   detecting the presence of any of a set of one or more characteristic sounds in the captured audio signal;
   transmitting the sounds from the user's environment to the user in response to a detection that one or more of the set of characteristic sounds is present in the captured audio signal;
   capturing images of the headset using a camera positioned apart from the headset; and
   detecting, from images captured by the camera positioned apart from the headset, an object approaching the headset user's head.

10. A machine-readable, non-transitory storage medium which stores computer software which, when executed by a computer, causes the computer to carry out the method of claim 9.

* * * * *